United States Patent
Jarbelius

(10) Patent No.: US 12,473,616 B2
(45) Date of Patent: Nov. 18, 2025

(54) BLANK FOR A DAMASCUS PATTERNED ARTICLE

(71) Applicant: Damasteel AB, Söderfors (SE)

(72) Inventor: Per Jarbelius, Gävle (SE)

(73) Assignee: Damasteel AB, Söderfors (SE)

( * ) Notice: Subject to any disclaimer, the term of this patent is extended or adjusted under 35 U.S.C. 154(b) by 39 days.

(21) Appl. No.: 17/059,433

(22) PCT Filed: May 17, 2019

(86) PCT No.: PCT/SE2019/050454
§ 371 (c)(1),
(2) Date: Nov. 28, 2020

(87) PCT Pub. No.: WO2019/231379
PCT Pub. Date: Dec. 5, 2019

(65) Prior Publication Data
US 2021/0207250 A1    Jul. 8, 2021

(30) Foreign Application Priority Data

May 28, 2018   (SE) .................................. 1850646-9

(51) Int. Cl.
| | |
|---|---|
| *C22C 38/24* | (2006.01) |
| *B22F 3/15* | (2006.01) |
| *B22F 3/17* | (2006.01) |
| *B22F 5/00* | (2006.01) |
| *C21D 8/02* | (2006.01) |
| *C22C 33/02* | (2006.01) |
| *C22C 38/00* | (2006.01) |
| *C22C 38/02* | (2006.01) |
| *C22C 38/04* | (2006.01) |
| *C22C 38/22* | (2006.01) |
| *B22F 1/05* | (2022.01) |

(52) U.S. Cl.
CPC ............ *C22C 33/0285* (2013.01); *B22F 3/15* (2013.01); *B22F 3/17* (2013.01); *B22F 5/006* (2013.01); *C21D 8/0205* (2013.01); *C21D 8/0226* (2013.01); *C22C 38/001* (2013.01); *C22C 38/02* (2013.01); *C22C 38/04* (2013.01); *C22C 38/22* (2013.01); *C22C 38/24* (2013.01); *B22F 1/05* (2022.01); *B22F 2005/001* (2013.01); *B22F 2301/35* (2013.01); *B22F 2303/01* (2013.01); *B22F 2303/40* (2013.01); *B22F 2304/10* (2013.01); *C21D 2211/001* (2013.01); *C21D 2211/005* (2013.01); *C21D 2211/008* (2013.01); *C22C 2202/02* (2013.01)

(58) Field of Classification Search
CPC ....... C22C 38/24; C22C 38/001; C22C 38/02; C22C 38/04; C22C 38/22; C22C 2202/02; B22F 3/15; B22F 2301/35; B22F 2303/01; B22F 2303/40; C21D 2211/001; C21D 2211/005; C21D 2211/008
See application file for complete search history.

(56) References Cited

U.S. PATENT DOCUMENTS

| | | | |
|---|---|---|---|
| 3,171,195 A | 3/1965 | Darling | |
| 4,399,611 A | 8/1983 | Maringer | |
| 4,881,430 A | 11/1989 | Hubbard | |
| 5,167,761 A * | 12/1992 | Westendorp | ...... H01L 21/31116 438/743 |
| 5,185,044 A | 2/1993 | Verhoeven et al. | |
| 5,815,790 A * | 9/1998 | Billgren | ..................... B21J 1/00 419/49 |
| 2003/0119599 A1 | 6/2003 | Byrne et al. | |
| 2007/0175857 A1 | 8/2007 | Boone | |
| 2008/0092694 A1* | 4/2008 | Droese | ...................... B26B 3/00 219/152 |
| 2008/0233225 A1* | 9/2008 | Jonson | ................ C22C 33/0285 420/12 |
| 2009/0246065 A1* | 10/2009 | Yamada | .................. C22C 38/38 420/42 |
| 2010/0227193 A1 | 9/2010 | Midgett | |
| 2016/0289785 A1* | 10/2016 | Matsuzawa | ............ C21D 6/002 |
| 2017/0327916 A1* | 11/2017 | Lee | ........................... C21D 6/02 |

FOREIGN PATENT DOCUMENTS

| | | |
|---|---|---|
| CN | 1140426 A | 1/1997 |
| CN | 1343151 A | 4/2002 |
| CN | 101248204 A | 8/2008 |
| CN | 102528265 A | 7/2012 |
| CN | 103264129 A | 8/2013 |
| CN | 105150608 A | 12/2015 |

(Continued)

OTHER PUBLICATIONS

I. Olefjord and L. Wegrelius, The Influence of Nitrogen on the Passivation of Stainless Steels, 1996, Pergamon, Corrosion Science vol. 38, No. 7, pp. 1203-1220 (Year: 1996).*

(Continued)

*Primary Examiner* — Anthony M Liang
(74) *Attorney, Agent, or Firm* — KARCESKI IP LAW, PLLC

(57) ABSTRACT

The invention relates to a stainless steel blank for making a Damascus patterned article, wherein the steel blank is made from at least two different nitrogen alloyed stainless steels having a chromium content of 11-25 weight %, of which at least one of the steels comprises nitrogen in an amount of 0.10-5.0 weight % and, optionally, at least one of the steels comprises nitrogen in an amount of 0.01-0.5 weight %.

18 Claims, No Drawings

(56) References Cited

FOREIGN PATENT DOCUMENTS

| CN | 105934530 | A | | 9/2016 | |
|---|---|---|---|---|---|
| CN | 106222539 | A | | 12/2016 | |
| CN | 106676410 | A | | 5/2017 | |
| CN | 108034896 | A | * | 5/2018 | ............ B22F 3/101 |
| DE | 102011108164 | A1 | | 1/2013 | |
| JP | H09507696 | A | | 8/1997 | |
| JP | 2007061944 | A | | 3/2007 | |
| JP | 2007515553 | A | | 6/2007 | |
| JP | 2009161802 | A | * | 7/2009 | |
| KR | 20090083680 | A | | 8/2009 | |
| RU | 2288101 | C1 | | 11/2006 | |
| WO | 199519861 | A1 | | 7/1995 | |
| WO | 2000058043 | A1 | | 10/2000 | |
| WO | 2010118820 | A1 | | 10/2010 | |
| WO | 2011031182 | A1 | | 3/2011 | |
| WO | WO-2014014246 | A1 | * | 1/2014 | ........... B22D 11/002 |
| WO | 2015076771 | A2 | | 5/2015 | |
| WO | 2018080374 | A1 | | 5/2018 | |

OTHER PUBLICATIONS

Chen C, CN-108034896-A machine translation, May 12, 2018 (Year: 2018).*
Anzai H, JP-2009161802-A machine translation, Jul. 23, 2009 (Year: 2009).*
J. R. Davis, Selection of Wrought Martensitic Stainless Steels, Jan. 1, 1993, ASM International, ASM Handbook vol. 6, pp. 432-442 (Year: 1993).*
Chinese Office Action dated Mar. 24, 2022, for Chinese Patent Application No. 201980035953.2.
Japanese Office Action dated Feb. 21, 2023, for Japanese Patent Application No. 2020-567071.

* cited by examiner

BLANK FOR A DAMASCUS PATTERNED ARTICLE

TECHNICAL FIELD

The invention relates to a blank for a Damascus patterned article. In particular, the invention relates to a blank for a Damascus patterned stainless steel hand held knifes such as hunting knives, kitchen knives and diving knives. The invention also relates to a method of producing a blank for patterned articles, which can be used for the manufacture of decorative metal objects.

BACKGROUND OF THE INVENTION

Decorative metal manufacturing techniques have been known for hundreds of years for making mixed metal laminates having distinct layered patterns. Forge welding was used in Syria to produce hard and flexible Damascus steel for the blades of swords and knives. In Japan a similar technique called Mokume Gane was used for the same purpose. The objects obtained in this way are referred to have a Damascus pattern, sometimes also referred to as a damascene pattern.

Nowadays, Damascus patterned metal objects are produced in many different ways for a large number of material combinations. JP2007061944, WO2015076771, WO2010118820, CN103264129, U.S. Pat. No. 481,430 and U.S. Pat. No. 4,399,611 disclose different lamination techniques for obtaining the desired decorative pattern. US20100227193 and U.S. Pat. No. 3,171,195 disclose extrusion methods, wherein one metal may be provided in the form of a powder. U.S. Pat. No. 5,185,044, US2007175857 and WO2011031182 disclose further methods of obtaining Damascus pattered objects.

WO9519861 discloses the making of stainless composite metal products having a Damascus pattern, including the step of providing a capsule comprising at least two stainless steel powders arranged in parallel elongated layers, hot isostatic pressing the capsule for forming a blank, forging and hot rolling the blank to an intermediate dimension, distorting the elongated structure by mechanical working and thereafter hot working the blank to the final dimension. The blank may be used to produce a Damascus patterned stainless steel hand held knife to be used for e.g. carving, hunting, diving or kitchen work.

DE102011108164 A1 discloses a method of producing stainless steel Damascus patterned objects by a particular lamination technique.

The selection of stainless steel material for knife blades involves a number of requirements for obtaining knife steel having the optimum property profile for the intended use. Important factors for the properties of a knife steel include at least the following often conflicting factors: hardness, hardenability, strength, ductility, toughness, edge performance, corrosion resistance, wear resistance and manufacturability, wherein the edge performance includes sharpness, edge stability and wear resistance. The edge stability or edge retention is a measure of how long the steel edge will retain its sharpness.

When considering the knife steel performance the following properties are often considered the most important: edge retention, corrosion resistance, hardness, toughness and wear resistance. However, it is not possible to produce a steel having a maximum hardness and at the same time a maximum toughness. In addition, a high corrosion resistance is considered to result in a reduced edge performance. The selection of a steel for a knife blade for a particular use is always a compromise.

SUMMARY OF THE INVENTION

The general object of the present invention is to provide an improved blank for a Damascus patterned article, in particular an improved blank for a Damascus patterned stainless steel knife such that a steel blade having an improved property profile can be manufactured. The invention also relates to Damascus patterned stainless steel knife made from the claimed blank as well as a method for producing the blank.

These objects are achieved by the means of the invention as defined in the independent claims.

Further advantageous embodiments of the invention have been specified in the dependent claims.

The present invention overcomes the drawbacks of the prior art. In particular, by providing a stainless steel blank for making a Damascus patterned knife, wherein the steel blank comprises at least two different nitrogen alloyed stainless steels having a chromium content of 11-25 weight %, of which at least one of the steels comprises nitrogen in an amount of 0.10-5.0 weight % and at least one of the steels comprises nitrogen in an amount of 0.01-0.5 weight %.

Preferably, the stainless steel blank fulfils at least one of the following conditions:

two or more steels of the at least two stainless steels comprise nitrogen in an amount of 0.10-5.0 weight %,
at least one steel of the at least two stainless steels comprises nitrogen in an amount of 0.01-0.09 weight % or 0.10-0.30 weight %,
all stainless steels in the blank are ferromagnetic,
the stainless steels are selected from one or more of the group of martensitic, martensitic/austenitic, ferritic/austenitic and austenitic stainless steels,
all stainless steels in the blank have a carbon content of more than 0.10 weight %.
the difference in nitrogen content between at least two of the stainless steels is at least 0.05 weight %.

The martensitic/austenitic stainless steel preferably comprises 2-30 vol. % austenite in order to provide an optimized toughness of the steel in the hardened condition.

Preferably, the parts of the stainless steel blank having a nitrogen in an amount of 0.10-5.0 weight % comprise 0.5-15 volume % primary VN particles, wherein at least 80% of the particles have a size of ≤3 µm, preferably ≤1 µm.

The at least two stainless steels may fulfil at least one of the following requirements:

C 0.1-3.0
N 0.1-2.9
Si 0.1-1.3
Mn 0.1-2.0
Cr 12-20
Mo 0.1-5.5
V 0.1-5.0
W ≤1
Nb ≤2 the parts of the blank having a nitrogen in an amount of 0.10-5.0 weight % comprise 1-10 volume % primary VN particles, wherein at least 90% of the particles have a size of ≤2 µm.

Two or more than two of the at least two stainless steels may fulfil at least one of the following requirements:

C 0.2-0.7
N 0.4-1.9

Si 0.2-1.0
Mn 0.2-1.0
Cr 13-19
Mo 1.3-3.5
V 0.5-2.5
W≤0.1
Nb≤1.0 the parts of the blank having a nitrogen in an amount of 0.10-5.0 weight % comprise 2-9 volume % primary VN particles, wherein at least 90% of the particles have a size of ≤1 µm.

The stainless steel blank can be provided with a steel core having a thickness of 10-50% of the total thickness of the blank, wherein the blank further comprises 5-100 stainless steel layers on each side of the core, and wherein the core steel preferably comprises nitrogen in an amount of 0.10-5.0 weight %.

The stainless steel blank of the present invention can be used to produce a Damascus patterned stainless steel knife, which preferably fulfils at least one of the following requirements:

at least a part of the edge is micro-serrated,
the edge has an hardness of at least 57 HRC,
all steel layers have a PREN>20,
at least one steel layer has a PREN>25,
the difference in PREN between adjacent steel layers is >1, wherein PREN=% Cr+3.3% Mo+30% N and % Cr, % Mo and % N are the contents dissolved in the matrix. The lowest PREN number may be set to 21, 22, 23, 24 or 25 for one or more of the steel layers. It is believed that it the difference in PREN between adjacent steel layers is >1, then it is easier to obtain a decorative etching due to the difference in pitting corrosion resistance. The minimum difference may be set to 1.5, 2.0, 2.5 or even 3.0.

The invention also embraces a method of producing a steel blank, which comprises at least two different nitrogen alloyed stainless steels as defined above, wherein the process comprises the steps of: providing a capsule comprising at least two stainless steels having a chromium content of 11-25 weight % arranged in parallel or non-parallel elongated layers, wherein at least one of the steels comprises nitrogen in an amount of 0.10-5.0 weight %, hot isostatic pressing the capsule in order to form a blank, forging and hot rolling the blank to an intermediate dimension, and, optionally, distorting the elongated structure by mechanical working.

A method of producing a steel blank is primarily directed to the use of powder metallurgy (PM) steels. However, solid steel plates may also be used for a part of the blank, in particular for the core part. It is then preferable that said core steel also is produced by PM. Preferably, at least two the stainless steels used are powders, preferably gas atomized powders having a maximum particle size of 500 µm.

The invention is defined in the claims.

DETAILED DESCRIPTION OF THE INVENTION

The inventor of the present invention has found that is much easier to produce a stainless steel blank having an optimized property profile for making a Damascus patterned object, such as a knife, when the steel blank is made from at least two different nitrogen alloyed stainless steels of which at least on of the steels comprises nitrogen in a an amount of 0.10-5.0 weight % (wt. %) and at least one of the steels comprises nitrogen in an amount of 0.01-0.5 wt. %. Preferably at least two of the steels comprises nitrogen in an amount of 0.10-5.0 wt. %.

The improved property profile combines at the same time a good corrosion resistance with a high hardness and a high ductility. To a great extent the improved properties are a result of using nitrogen alloyed stainless steels, in particular if the steels are produced by powder metallurgy (PM). Particular good results can be achieved if the steel also contains vanadium, in particular in an amount of 0.5-7 wt. %, more preferably 0.9-5 wt. % and most preferably 1-4 wt. %. Vanadium forms evenly distributed primary precipitated carbides-, nitrides and/or nitrocarbides of the type M (N,C) in the matrix of the steel. In the present steels M is mainly vanadium but Cr and other elements may be present in the compound. This phase may also be denoted MX, wherein X is C, N and/or B. However, in the following this phase will simply be referred to as VN.

The benefits of the combined provision of N and V are firstly that the anisotropic phase of $M_7C_3$-carbide (~1700HV) is replaced partly or fully by the very hard and stable phase of small and evenly distributed hard phase VN (~2800HV). Thereby, the wear resistance is improved at the same volume fraction of hard phase. Secondly, the amount of Cr, Mo and N in solid solution at the hardening temperature is very much increased, because less chromium is bound in the hard phases and because the carbides of the type $M_{23}C_6$ and $M_7C_3$ do not have any solubility for nitrogen. Thereby, more chromium is left in solid solution and the thin passive chromium rich surface film is strengthened, which lead to an increased resistance to general corrosion and pitting corrosion.

The pitting resistance equivalent number (PREN) is often used to quantify pitting corrosion resistance of stainless steels, because pitting corrosion usually is the most relevant corrosion mechanism in martensitic stainless steels. A higher value indicates a higher resistance to pitting corrosion. For high nitrogen martensitic stainless steels the following expression may be used PREN=% Cr+3.3% Mo+30% N wherein % Cr, % Mo and % N are contents dissolved in the matrix. Said contents can be considered as the calculated equilibrium contents dissolved in the matrix at the austenitizing temperature ($T_A$). The dissolved contents can also be calculated with Thermo-Calc® for the actual austenitizing temperature ($T_A$). The higher the PREN-value is, the higher is the resistance against corrosion. Accordingly, in slat water and other environments containing chloride ions, the calculated PREN-value is of great importance and should preferably be at least 25. The lower limit for one or more layers of the blank may be set to 21, 22, 23, 24, 25 26, 27, 28, 29 or 30. Preferably, all layers of the finished product, e.g. a knife, should have a PREN-value of at least 25.

The size of the primary VN hard phase particles may be determined by microscopic image analysis. The size thus obtained is the diameter corresponding to the diameter of a circle with the same projected area as the particle, the Equivalent Circle Diameter (ECD), wherein $ECD = 2\sqrt{A/\pi}$, where A is the surface of the particles in the studied section.

The stainless steel blanks of the present invention are preferably made by powder metallurgy (PM). A steel produced by powder metallurgy will have a fine and uniform distribution of all the primary hard phase particles. The size of the VN particles is ≤5 µm, and at least 80 vol. % of the particles has a size of ≤3 µm preferably ≤1 µm. The parts of the blank having a nitrogen in an amount of 0.10-5.0 weight % comprises 0.5-15 volume % primary VN particles. The preferred route for the PM material is nitrogen gas atomizing followed by hot isostatic pressing (HIP).

Nitrogen is an important element in the present invention. Nitrogen in solid solution greatly improves the corrosion resistance and form very hard nitrides with several alloying elements, in particular V, Nb, Ti and Ta of which V is the most used. Nitrogen cannot be included in $M_7C_3$ and can therefore be used in higher contents than the carbon content to avoid the precipitation of $M_7C_3$-carbides if so desired. In order to get the desired type and amount of hard phases the nitrogen content is balanced against the contents of the strong carbide formers, in particular vanadium. Accordingly, the nitrogen content can be used to tailor the desired properties of the at least two different steels to be used in the present invention. In addition, the nitrogen dissolved in the hard phases such as VN can at least partly be dissolved during the austenitization and thereby greatly improve the pitting corrosion resistance. Hence, the nitrogen content is limited to 0.10-5% in at least one of the stainless steels to be used. The lower limit for nitrogen in this steel may be set to 0.15, 0.20, 0.25, 0.30, 0.35, 0.40, 0.45, 0.50, 0.60, 0.79, 0.80, 0.90, 1.0, 1.1, 1.2 or 1.1%. The upper limit may be set to 4.5, 4.0, 3.0, 2.5, 2.2, 2.0, 1.9, 1.8 or 1.7%.

When used in lower contents in the range of 0.01-0.50% nitrogen can be help to avoid grain growth by forming minute nitrides. The lower limit may be set to 0.011, 0.012, 0.015, 0.02, 0.03, 0.04 or 0.05. The upper limit may be restricted to 0.4, 0.3, 0.2, 0.1, 0.09, 0.08, 0.07, 0.06, or 0.05%.

Chromium is the most important element in stainless steel. When Cr is present in a dissolved amount of at least 11%, chromium results in the formation of a passive film on the steel surface. However, Cr is also a carbide former. Chromium shall therefore be present in the steel in an amount between 11 and 25% in order to give the steel a good hardenability as well as good oxidation and corrosion resistance. Preferably, Cr is present in an amount of more than 16% if the pitting corrosion resistance is of main impartance. However, Cr is a strong ferrite former and in order to avoid ferrite after hardening the amount needs to be controlled. For practical reasons the upper limit may be 20%.

Carbon may be used in substantial amounts in order to provide a good hardenability and/or for forming carbides. Thereby a good wear resistance can be obtained. A suitable range for carbon is 0.1-3.0 wt. %. The lower limit may be 0.2, 0.3, 0.4, 0.5, 0.6, 0.7, 0.8, 0.9 or 1.0 wt. %. The upper limit may be 2.4, 2.2, 2.0, 1.8, 1.6, 1.4, 1.2 1.0, 0.8 or 0.6 wt. %.

The stainless steels used should preferably be ferromagnetic and most preferably martensitic steels. The martensitic stainless steels may have a carbon content of at least of at least 0.2 wt. %, in particular if the nitrogen content is low.

In order to ensure a high hardness it is preferred that the combined content of carbon and nitrogen should be at least 0.5 wt. %, preferably higher than 0.6 wt. %. The lower limit may be 0.7, 0.8, 0.9, 1.0, 1.1, 1.2, 1.3, 1.4, 1.5, 1.6 1.7 or 1.8 wt. %. Preferably, the amounts of nitrogen and carbon are balanced such that the ratio C/N falls in the range of 0.19-0.48 in order to optimize the pitting corrosion resistance in high-N steels.N Silicon may be used for deoxidation. Si is also a strong ferrite former. Si is therefore preferably limited to 1.3 wt. %. The lower limit may be 0.1 wt. % in order to get the desired degree of deoxidation. A preferred range is 0.2-1.0 wt. %.

Manganese contributes to improving the hardenability of the steel. If the content is too low then the hardenability may be too low. Manganese may therefore be present in a minimum content of 0.10%, preferably at least 0.15, 0.20, 0.25 or 0.30 wt. %. The steel may contain a maximum of 2.0 wt. % Mn. A preferred range is 0.2-1.0 wt. %.

Molybdenum is known to have a very favourable effect on the hardenability. It is also known to improve the pitting corrosion resistance. The minimum content may therefore be set to 0.1 wt. %. Molybdenum is a strong carbide forming element and also a strong ferrite former. The maximum content of molybdenum may therefore be set to 5.5 wt. %. Preferably Mo is be limited to 3.5 wt. %.

Although the precision of the contents of the alloying elements given above has been given with a specific number of digits, generally one or two, it is expressly stated that all alloying contents may be expressed with one or two digits higher precision. Hence, a carbon content of 0.1% may also be expressed as a carbon content of 0.10% or 0.100%. Austenitic stainless steels of the type 304 and 304L having a nitrogen content in the range of 0.01 to 0.10% may be excluded from the present invention.

Example 1

A stainless steel blank for making a Damascus patterned steel was produced from the two martensitic stainless steel powders.

The powders had the following compositions:

|    | Steel A | Steel B |
|----|---------|---------|
| C  | 0.2     | 1.7     |
| N  | 1.9     | 0.03    |
| Si | 0.3     | 0.8     |
| Mn | 0.3     | 0.3     |
| Cr | 20      | 18      |
| Mo | 2.5     | 1.0     |
| V  | 2.85    | 3.0     |
| Fe | bal.    | bal.    |

The powders were filled into a container having a diameter of 250 mm and a stainless steel blank was produced by hot isostatic pressing the capsule in order to form a first blank, forging and hot rolling the blank to an intermediate dimension, distorting the elongated structure by mechanical working and thereafter hot working the blank to the final dimension in the same way as described in WO95/19861.

The samples were subjected to a conventional hardening by austenitizing at 1080° C. for 30 minutes followed by deep cooling in liquid nitrogen. By tempering two times for two hours (2×2 h) at a temperature of 180-260° C. hardness values of 57-60 HRC can easily be attained in combination with a good corrosion resistance, because of a high amount of chromium in solid solution. By tempering (2×2 h) at 200° C. a uniform hardness of 59 HRC is obtained. The microstructure of the high nitrogen alloyed steel A consisted of about 9 vol. % VN particles having a size of <1 μm embedded in a martensitic matrix. Steel B has a similar structure but the hard phases consisted of 2 vol. % VC and about 16 Vol. % $M_7C_3$. Knives made from this steel blank will have a very high edge retention, toughness and a very good corrosion resistance. Steel A has about 18% Cr in solid solution and is therefore more corrosion resistant than steel B with about 12% Cr in solid solution, which, in turn make it easy to etch the finished product in order to enhance the damascene pattern.

Example 2

A stainless steel blank for making a Damascus patterned steel was produced from the two martensitic stainless steels utilizing one powder (Steel A) and sheets of a less corrosion resistant steel containing 9 vol. % coarse $M_7C_3$ carbides (Steel C).

The steels had the following compositions:

|    | Steel A | Steel C |
|----|---------|---------|
| C  | 0.2     | 1.1     |
| N  | 1.9     | 0.03    |
| Si | 0.3     | 0.7     |
| Mn | 0.3     | 0.6     |
| Cr | 20      | 17      |
| Mo | 2.5     | 0.5     |
| V  | 2.85    | 0.05    |
| Fe | bal.    | bal.    |

The materials were filled into a container having a diameter of 250 mm and a stainless steel blank was produced by hot isostatic pressing the capsule in order to form a blank, forging and hot rolling the blank to an intermediate dimension, distorting the elongated structure by mechanical working and thereafter hot working the blank to the final dimension in the same way as described in WO95/19861.

The samples were subjected to a conventional hardening by austenitizing at 1080° C. for 30 minutes followed by deep cooling in liquid nitrogen followed by tempering (2×2 h) at 200° C. The microstructure steel A was as in Example 1. Steel C on the other hand had 9 vol. % coarse $M_7C_3$ carbides dispersed in a martensitic matrix and about 12.5% Cr in solid solution.

Knives made from this steel blank comprise steel layers having coarse carbides, which may fall out of the edge and make the corresponding part of the edge micro-serrated. The other parts of the edge consisting of the fine nitride grade steel will retain its sharpness. Hence, by selecting a desired orientation of the two different layers it is possible to produce a knife blade having an in-situ formed micro serrated edge in combination with a sharp edge. Such knives may be particular useful in applications, where wear resistant is demanded.

Instead of using conventionally produced sheets of the steel grade having coarse carbides, it is possible to used stainless steel powders comprising coarse hard phase particles such as carbides or nitrides. For instance an admixed powder may be used.

Example 3

A stainless steel blank for making a Damascus patterned steel was produced from the two martensitic stainless steel powders for obtaining a steel blank, which can be used for making corrosion resistant knifes having a high hardness and edge retention.

The powders had the following compositions:

|    | Steel D | Steel E |
|----|---------|---------|
| C  | 0.54    | 0.62    |
| N  | 0.2     | 0.11    |
| Si | 0.45    | 0.2     |
| Mn | 0.4     | 0.6     |
| Cr | 17.3    | 14      |
| Mo | 1.1     | —       |
| V  | 0.1     | —       |
| Fe | bal.    | bal.    |

The powders were filled into a container having a diameter of 250 mm and a stainless steel blank was produced by hot isostatic pressing the capsule in order to form a blank, forging and hot rolling the blank to an intermediate dimension, distorting the elongated structure by mechanical working and thereafter hot working the blank to the final dimension of 4 mm in the same way as described in WO95/19861.

This material can be subjected to a conventional hardening by austenitizing at 1050° C. for 15 minutes followed by quenching in oil and tempering (2×2 h) at 200° C. directly after hardening. Knives made from this steel blank will have an excellent edge performance, a very good corrosion resistance and a high hardness.

Example 4

A stainless steel blank for making a Damascus patterned steel was produced from the two martensitic stainless steel powders for obtaining a steel blank, which can be used for making corrosion resistant knifes having a high hardness and edge retention.

The powders had the following compositions:

|    | Steel F | Steel G |
|----|---------|---------|
| C  | 0.36    | 1.06    |
| N  | 1.54    | 0.046   |
| Si | 0.32    | 0.41    |
| Mn | 0.33    | 0.31    |
| Cr | 18.3    | 14.3    |
| Mo | 1.1     | 3.9     |
| V  | 3.5     | 0.21    |
| Fe | bal.    | bal.    |

The powders were filled into a container having a diameter of 250 mm and a stainless steel blank was produced by hot isostatic pressing the capsule in order to form a blank, forging and hot rolling the blank to an intermediate dimension, distorting the elongated structure by mechanical working and thereafter hot working the blank to the final dimension of 4 mm in the same way as described in WO95/19861.

This material can be subjected to a conventional hardening by austenitizing at 1050° C. for 15 minutes followed by quenching in oil and tempering (2×2 h) at 200° C. directly after hardening. Knives made from this steel blank will have an excellent edge performance, a very good corrosion resistance and a high hardness.

Example 5

A stainless steel blank for making a Damascus patterned steel was produced from the three martensitic stainless steel powders for obtaining a steel blank, which can be used for making corrosion resistant knifes having a cutting steel core with an edge having a very high hardness and edge retention. To be specific, the blank was produced to have three equally thick layers. The core was made of the high nitrogen alloyed Steel F and on each side of the core 18 alternating layers of Steels G and H were provided.

The powders had the following compositions:

|  | Steel F | Steel G | Steel H |
|---|---|---|---|
| C | 0.36 | 1.06 | 0.61 |
| N | 1.54 | 0.046 | 0.042 |
| Si | 0.32 | 0.41 | 0.44 |
| Mn | 0.33 | 0.31 | 0.34 |
| Cr | 18.3 | 14.3 | 13.3 |
| Mo | 1.1 | 3.9 | 0.15 |
| V | 3.5 | 0.21 | 0.10 |
| Fe | bal. | bal. | bal. |

The powders were filled into a container having a diameter of 250 mm and a stainless steel blank was produced by hot isostatic pressing the capsule in order to form a blank, forging and hot rolling the blank to an intermediate dimension, distorting the elongated structure by mechanical working and thereafter hot working the blank to the final dimension of 4 mm in the same way as described in WO95/19861.

This material can be subjected to a conventional hardening by austenitizing at 1080° C. for 30 minutes followed by quenching in a vacuum furnace, followed by deep cooling in liquid nitrogen and tempering (2×2 h) at 200° C. Knives made from this steel blank will have a very good corrosion resistance and a high hardness as well as an extraordinarily edge performance.

The invention claimed is:

1. A stainless steel blank for making a Damascus patterned article, comprising:
    a core comprising a nitrogen alloyed, martensitic stainless steel comprising chromium in an amount of 11 to 25 weight %, nitrogen in an amount of 0.60 to 5.0 weight %, vanadium in an amount of 0.90 to 5 weight %, and carbon in an amount of at least 0.2 weight %,
    a first steel layer comprising a nitrogen alloyed, martensitic stainless steel comprising chromium in an amount of 11 to 25 weight %, nitrogen in an amount of 0.01 to 0.5 weight %, and carbon in an amount of at least 0.2 weight %,
    wherein the core is made from a powder or a solid steel plate produced by powder metallurgy,
    wherein the first steel layer is made from a powder,
    wherein the core steel has a thickness of 10-50% of a total thickness of the stainless steel blank,
    wherein the stainless steel blank comprises 5-100 steel layers on each side of the core,
    wherein at least one steel layer of the stainless steel blank has a matrix with a PREN>25,
    wherein the PREN=weight % Cr+3.3 weight % Mo+30 weight % N,
    wherein a difference in the PREN between adjacent steel layers is >1,
    wherein the Cr, Mo, and N are dissolved in the matrix, and
    wherein a combined content of carbon and nitrogen in the core and in the first steel layer is at least 0.5 weight %.

2. The stainless steel blank according to claim 1, wherein the core further comprises 0.5 to 15 volume % primary VN particles, and wherein at least 80% of primary VN particles have a size of ≤3 μm.

3. The stainless steel blank according to claim 1, wherein the core comprises: 0.2 to 3.0 weight % C, 0.6 to 2.9 weight % N, 0.1 to 1.3 weight % Si, 0.1 to 2.0 weight % Mn, 12 to 20 weight % Cr, 0.1 to 5.5 weight % Mo, ≤1 weight % W, and ≤2 weight % Nb, and 1 to 10 volume % primary VN particles, and wherein at least 90% of the primary VN particles have a size of ≤2 μm.

4. The stainless steel blank according to claim 1, wherein the core comprises: 0.2 to 0.7 weight % C, 0.6 to 1.9 weight % N, 0.2 to 1.0 weight % Si, 0.2 to 1.0 weight % Mn, 13 to 19 weight % Cr, 1.3 to 3.5 weight % Mo, 0.9 to 2.5 weight % V, ≤0.1 weight % W, and ≤1.0 weight % Nb, and 2 to 9 volume % primary VN particles, and wherein at least 90% of primary VN particles have a size of ≤1 μm.

5. A Damascus patterned stainless steel knife made from the stainless steel blank of claim 1, wherein at least a part of an edge of the knife is micro-serrated and/or the edge has a hardness of at least 57 Hardness Rockwell C (HRC).

6. A method of producing the stainless steel blank of claim 1, the method comprising the steps of:
    providing a capsule comprising at least two stainless steels having a chromium content of 11 to 25 weight % arranged in parallel or non-parallel elongated layers, wherein at least one of the stainless steels comprises nitrogen in an amount of 0.10 to 5.0 weight % and wherein at least one of the stainless steels is in the form of a powder;
    hot isostatic pressing the capsule in order to form a blank; and forging and hot rolling the blank to an intermediate dimension.

7. The method of claim 6, wherein at least two of the stainless steels used are powders.

8. The stainless steel blank according to claim 1, wherein the first steel layer comprises nitrogen in an amount of 0.01 to 0.09 weight %.

9. The stainless steel blank according to claim 1, wherein all of the nitrogen alloyed, martensitic stainless steels in the stainless steel blank are ferromagnetic.

10. The stainless steel blank according to claim 2, wherein at least 80% of the primary VN particles have a size≤1 μm.

11. The Damascus patterned stainless steel knife of claim 5, wherein all steel layers in the knife have a pitting resistance equivalent number (PREN)>20.

12. The method of claim 6, further comprising distorting the elongated layers by mechanical working.

13. The method of claim 7, wherein the powders are gas atomized powders having a maximum particle size of 500 μm.

14. The stainless steel blank according to claim 1, at least one of the nitrogen alloyed, martensitic stainless steels comprises nitrogen in an amount of 0.10 to 0.30 weight %.

15. The stainless steel blank according to claim 1, further comprising:
    a second steel layer comprising a nitrogen alloyed, martensitic stainless steel comprising chromium in an amount of 11 to 25 weight %, nitrogen in an amount of 0.01 to 0.5 weight %, and carbon in an amount of at least 0.2 weight %.

16. The stainless steel blank according to claim 15, wherein the second steel layer differs from the first steel layer by at least 0.05 weight % N.

17. The stainless steel blank according to claim 15, wherein thicknesses of the first steel layer and the second steel layer are equal.

18. The stainless steel blank according to claim 1, wherein the first steel layer further comprises 0.1 to 5.0 weight % V.

* * * * *